UNITED STATES PATENT OFFICE.

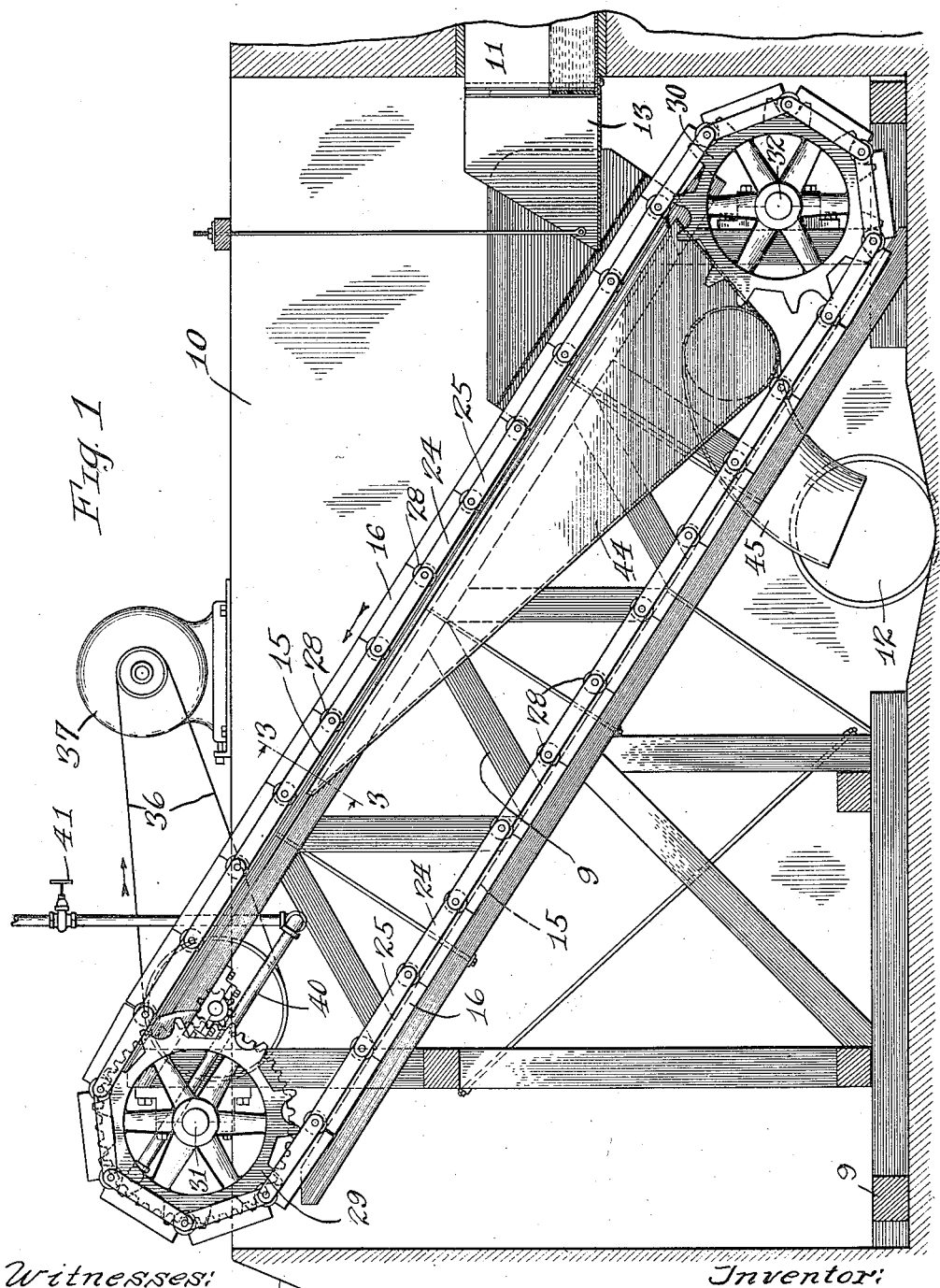

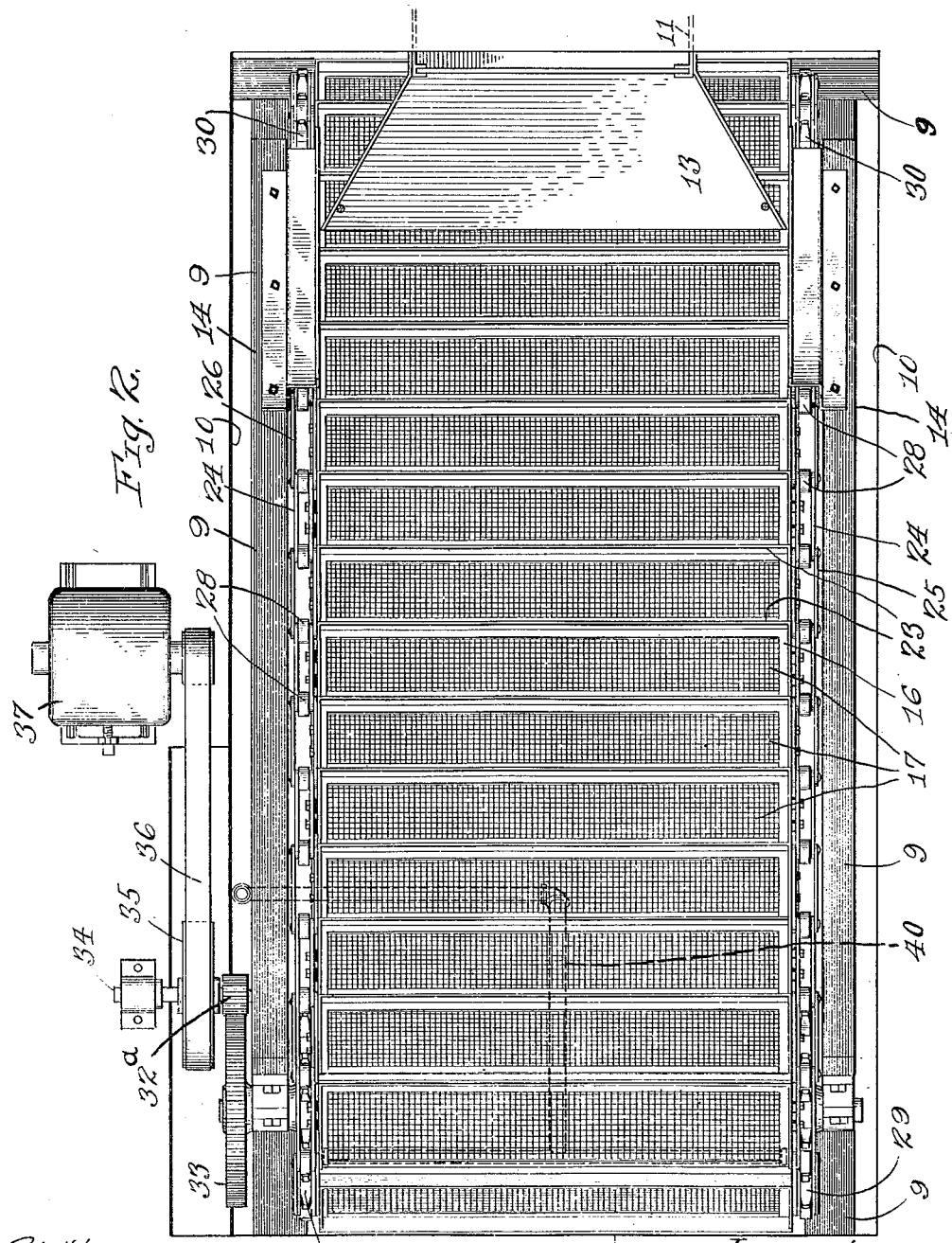

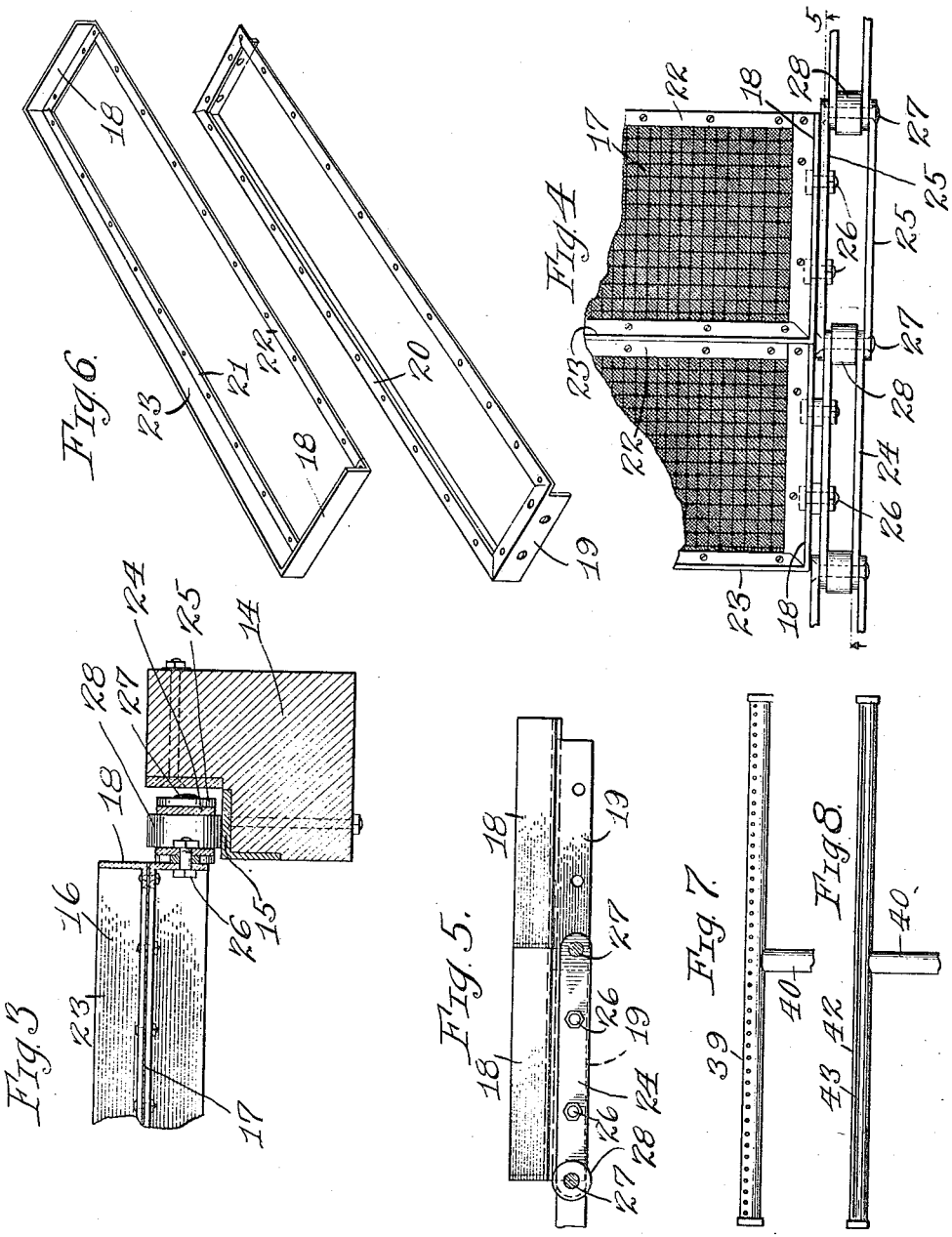

CHARLES A. JENNINGS, OF CHICAGO, ILLINOIS, ASSIGNOR TO A. E. NICHOLS, OF PHILADELPHIA, PENNSYLVANIA.

APPARATUS FOR SEPARATING THE SOLID MATTER FROM SEWAGE.

1,149,650.  Specification of Letters Patent.  Patented Aug. 10, 1915.

Application filed November 3, 1913. Serial No. 798,888.

*To all whom it may concern:*

Be it known that I, CHARLES A. JENNINGS, a citizen of the United States, residing at Chicago, in the county of Cook and State of Illinois, have invented certain new and useful Improvements in Apparatus for Separating the Solid Matter from Sewage, of which the following is a specification, reference being had to the accompanying drawings.

My invention relates to the treatment of sewage for separating the solid matter therefrom so as in a measure to purify it, and also to recover the solid matter for use as fertilizer material.

It has for its object to provide an improved apparatus capable of treating large quantities of sewage expeditiously, economically and efficiently. I accomplish this object as illustrated in the drawings and as hereinafter described. What I regard as new is set forth in the claims.

In the accompanying drawings,—Figure 1 is a side elevation of my improved apparatus; Fig. 2 is a plan view thereof; Fig. 3 is an enlarged detail, being a partial cross-section on line 3—3 of Fig. 1; Fig. 4 is an enlarged detail, being a partial plan view illustrating the construction of the conveyer mechanism; Fig. 5 is an enlarged detail, being a vertical longitudinal section on line 5—5 of Fig. 4; Fig. 6 is a perspective view illustrating the two frames which make up one of the screen-holding units; Fig. 7 is a view showing one form of head through which compressed air or steam is directed through the screens to deliver the separated solid matter; and Fig. 8 is a view showing a modified form of head.

My improved apparatus, generally speaking, comprises an endless conveyer made up of a number of screen-holding units hinged together in series, the conveyer being set in an inclined position so as to receive the discharge from the sewer upon its upper surface, near the lower end of the conveyer, the arrangement being such that as the conveyer travels the liquid sewage passes through the upper screens, and thence out to the sewage outlet. The conveyer travels continuously when in operation, so that the solid matter is carried up to the upper end of the conveyer, where a blast of compressed air or steam is directed from the inside out through the screens, thereby blowing off the solid matter from the screen surfaces as they pass successively opposite the point of air or steam discharge, so that it may be collected in a suitable receptacle provided for the purpose. Thus the sewage discharged through the outlet sewer is relieved, to a greater or less extent, of its solid matter, depending upon the size of the mesh of the screens employed, while such solid matter as is removed by the screens is collected in a comparatively dry condition, so that it may be conveniently removed, to be employed as a fertilizer or fertilizer ingredient.

Referring now to the drawings for a more detailed description of the embodiment of my invention therein illustrated, 9 indicates the conveyer supporting frame, which, as shown in Fig. 1, is arranged in an inclined position in a suitable well 10, into one end of which a sewer 11 discharges. Near the bottom of the well is a sewer outlet 12.

13 indicates a chute which directs the sewage from the sewer 11 upon the surface of the conveyer, and is approximately of the width of the conveyer, so as to distribute the sewage over the surface thereof.

The conveyer supporting frame 9 comprises two pairs of longitudinally-arranged beams 14, the beams of each pair having on their upper inner margins tracks 15, as shown in Fig. 3. The two pairs of beams are suitably braced so that said beams are held rigidly in position and properly support an endless conveyer 16, arranged to travel in the direction indicated by the arrow in Fig. 1 over the conveyer frame. The conveyer 16 is composed of a number of screen units 17 which are rectangular in form and are arranged close together in series so as to make up a continuous flexible screen capable of traveling around the conveyer frame. Each of said screen units comprises an upper rectangular frame 18 and a lower rectangular frame 19 adapted to be fitted and secured together with the screen or screens between them. As shown in Fig. 6, the lower frame 19 is composed of an angle-iron bent to rectangular form and inverted so that a horizontal flange 20 is provided at its upper surface. The upper frame 18 is also an angle-iron having its end portions bent at right angles so as to form a three-sided frame adapted to register with and fit upon the lower frame 19. In the case of the upper frame 18, the horizontal flange 21 is the lower surface, so that when the two frames are fitted together the flanges 21 and 20 may be secured together. The open side of the frame 21 is provided with a flat strip 22 which overlies the corresponding portion of the flange 20 of the lower frame, and is secured to it. Thus when the two frames 18—19 are secured together with the screens between them, the vertical flanges 23 of the upper frames 18 form division plates between successive screens, as shown in Fig. 4, and serve to prevent the solid matter from rolling down over the screen surfaces. The vertical flange of the rear side of each lower frame is cut away in order to permit the necessary swinging of the conveyer as it travels around the ends of the conveyer frame. As shown in Fig. 4, two screens are provided between each pair of frames 18—19, one of said screens being of heavy wire and large mesh, and the other screen being of fine wire and close mesh, the latter resting upon the coarse screen, so that it is supported by it. In practice, I find that the fine screen requires replacement more or less frequently, depending on the condition under which the apparatus is used, and this may readily be accomplished by separating the two screen frames so that any unit may be repaired without interfering with the others.

The several screen units are closely connected together in series by two endless chains composed of pairs of links 24—25, best shown in Fig. 4. The lower screen frames 19 are connected to the inner links in any suitable way, as by bolts or rivets 26, the several units being pivotally connected together by pivots 27, which also carry anti-friction rollers 28. Thus each screen unit is pivotally connected with the adjacent ones, so that the conveyer is flexible, and may operate freely upon its supporting frame. The conveyer chains are mounted upon two pairs of sprocket-wheels 29—30 arranged at the upper and lower ends of the conveyer frame upon shafts 31—32, respectively. One of said shafts is idle, and the other, which in the construction shown is the upper shaft 31, is driven by means of a pinion 32ª, which meshes with a gear 33, mounted on the shaft 31, as shown in Fig. 2. The pinion 32ª is mounted on a shaft 34, carrying a pulley 35, which is driven by a belt 36 from a motor 37. The shaft 31 may, however, be driven in any other suitable way.

38 indicates a receptacle placed adjacent to the upper end of the conveyer to receive the solid matter carried up thereby.

39 indicates a perforated head or pipe which extends transversely of the conveyer between the sprocket-wheels 29 and below the line of travel of the several screen units.

The head 39 is connected by a pipe 40 with any suitable source of supply of compressed air or steam, the admission of which is controlled by a valve 41.

From the foregoing description it will be seen that the solid matter carried up by the conveyer will be blown off of the screens as soon as they pass over the head 39, and as such head is arranged to direct the air or steam blast so as to blow such solid matter over the receptacle 39, the solid matter is received in such receptacle. In some cases it is desirable to use a larger volume of air or steam under lower pressure, and in such cases I prefer to employ a head 42 provided with a longitudinal slot 43, as shown in Fig. 8, instead of with a series of perforations, as shown in Fig. 7.

44 indicates a trough arranged between the two conveyer tracks near the lower end of the conveyer to receive the liquid passing through the screens. Said trough is connected by a pipe 45 with the sewer outlet 12, so that the water passing through the screens flows immediately to the sewer outlet.

From the foregoing description it will be apparent that the sewage discharged upon the upper screen units is strained, leaving a large percentage of the solid matter upon the screen surfaces, while the liquid matter passes on freely to the sewer outlet. The solid matter thus separated either rests upon the screen surfaces or is held by the upwardly-projecting flanges 23, so that it is carried up to the point where it meets the air or steam blast, delivered through the head 39, and is then blown out into the receptacle 38.

That which I claim as my invention, and desire to secure by Letters Patent, is,—

1. An apparatus for separating the solid matter from sewage, comprising a suitable well into which the sewage is discharged, said well having an outlet, an endless conveyer mounted in an inclined position in said well and receiving the inflowing sewage upon the upper surface of its lower end portion, said conveyer having a screen surface, a receptacle adjacent to the upper end portion of the conveyer for receiving the solid matter retained by the screen surface thereof, and means at the upper end portion of the conveyer for directing a blast outwardly through the screen surface thereof for removing the solid matter therefrom and directing it to said receptacle.

2. An apparatus for separating the solid matter from sewage, comprising a suitable well into which the sewage is discharged, said well having an outlet, an endless conveyer mounted in an inclined position in said well and receiving the inflowing sewage upon the upper surface of its lower end portion, said conveyer having a screen surface composed of a plurality of screen frames hinged together, a receptacle adjacent to the upper end portion of the conveyer for receiving the solid matter retained by the screen surface thereof, and means at the upper end portion of the conveyer for directing a blast outwardly through the screen surface thereof for removing the solid matter therefrom and directing it to said receptacle.

3. An apparatus for separating the solid matter from sewage, comprising a suitable well into which the sewage is discharged, said well having an outlet, an endless conveyer mounted in an inclined position in said well and receiving the inflowing sewage upon the upper surface of its lower end portion, said conveyer having a screen surface, a receptacle adjacent to the upper end portion of the conveyer for receiving the solid matter retained by the screen surface thereof, and a perforated pipe extending transversely of the conveyer adjacent to the upper inner portion thereof and arranged to direct a blast outwardly through the screen surface as it passes over said pipe, whereby the solid matter carried by the screen is directed toward said receptacle.

4. An apparatus for separating the solid matter from sewage, comprising a suitable well into which the sewage is discharged, said well having an outlet, an endless conveyer mounted in an inclined position in said well and receiving the inflowing sewage upon the upper surface of its lower end portion, said conveyer having a screen surface, a receptacle adjacent to the upper end portion of the conveyer for receiving the solid matter retained by the screen surface thereof, means at the upper end portion of the conveyer for directing a blast outwardly through the screen surface thereof for removing the solid matter therefrom and directing it to said receptacle, and a trough disposed between the upper and lower surfaces of the conveyer under the sewage inlet, said trough communicating with the outlet of said well.

5. An endless conveyer of the character described, comprising a pair of endless chains composed of links hinged together, and a series of screen units, each comprising two frames secured together with screens between them, the upper frame having a vertical flange which extends transversely of the conveyer, and end flanges joining with said transverse flange, and the lower frame having downwardly-extending transverse and end flanges, the end flanges of the lower frame being secured to links of said chains.

CHARLES A. JENNINGS.

Witnesses:
JOHN L. JACKSON,
WILLIAM A. FURNNER.